(12) United States Patent
Fornek et al.

(10) Patent No.: US 10,271,404 B1
(45) Date of Patent: Apr. 23, 2019

(54) LINKED SECURITY LIGHTING SYSTEM AND METHODS

(71) Applicant: HeathCo LLC, Bowling Green, KY (US)

(72) Inventors: Martin James Fornek, Oswego, IL (US); Timothy Gale Birdwell, Lafayette, TN (US); Scott Blaise Tylicki, Bowling Green, KY (US)

(73) Assignee: HeathCo LLC, Bowling Green, KY (US)

( * ) Notice: Subject to any disclaimer, the term of this patent is extended or adjusted under 35 U.S.C. 154(b) by 0 days.

(21) Appl. No.: 15/455,846

(22) Filed: Mar. 10, 2017

Related U.S. Application Data

(60) Provisional application No. 62/306,593, filed on Mar. 10, 2016.

(51) Int. Cl.
*H05B 37/02* (2006.01)
*G08B 13/02* (2006.01)

(52) U.S. Cl.
CPC ......... *H05B 37/0227* (2013.01); *G08B 13/02* (2013.01); *H05B 37/0218* (2013.01); *H05B 37/0281* (2013.01)

(58) Field of Classification Search
CPC ............ H05B 37/0227; H05B 37/0218; H05B 37/0281; G08B 13/02
See application file for complete search history.

(56) References Cited

U.S. PATENT DOCUMENTS

| | | |
|---|---|---|
| 6,859,644 B2 | 2/2005 | Wang |
| 7,190,126 B1 | 3/2007 | Paton |
| 7,309,965 B2 | 12/2007 | Dowling et al. |
| 7,333,903 B2 | 2/2008 | Walters et al. |
| 7,969,102 B2 | 6/2011 | Chang |
| 8,033,686 B2 | 10/2011 | Recker et al. |
| 8,275,471 B2 | 9/2012 | Huizenga et al. |
| 8,476,565 B2 | 7/2013 | Verfuerth |

(Continued)

FOREIGN PATENT DOCUMENTS

| | | |
|---|---|---|
| CN | 103517493 | 1/2014 |
| WO | 2015140654 | 9/2015 |

OTHER PUBLICATIONS

Siddiqui et al., ZigBee Based Energy efficient Outdoor Lighting Control System, 2012, Korea.

*Primary Examiner* — Leon Flores

(74) *Attorney, Agent, or Firm* — Middleton Reutlinger

(57) ABSTRACT

The described embodiments relate to systems, methods, and apparatuses for establishing a network of sensor-responsive lighting units using an interface of each lighting unit. The interface of each lighting unit can include a channel selector switch for selecting a channel to which each lighting unit will be connected. In this way, the creation of a network can be created by placing the lighting units proximate to each other and selecting the same channel at the interface at each lighting unit. The lighting units can include sensors for detecting events occurring at each lighting unit, and information related to the detected events can be shared among other lighting units in the network. Each lighting unit can operate in different operating modes such as a testing mode for testing communications channels and a manual mode for allowing a lighting unit to operate independently of the information shared over the network.

13 Claims, 9 Drawing Sheets

(56) References Cited

U.S. PATENT DOCUMENTS

| | | | |
|---|---|---|---|
| 8,669,716 B2 | 3/2014 | Recker et al. | |
| 8,729,833 B2 | 5/2014 | Chemel et al. | |
| 9,213,084 B2 | 12/2015 | Ford | |
| 9,247,620 B2 | 1/2016 | Gritti et al. | |
| 2006/0044152 A1 | 3/2006 | Wang | |
| 2011/0264245 A1* | 10/2011 | Lim | H04L 12/12 700/90 |
| 2012/0080944 A1* | 4/2012 | Recker | H02J 9/02 307/25 |
| 2012/0086560 A1 | 4/2012 | Ilyes et al. | |
| 2012/0098445 A1* | 4/2012 | Park | H05B 37/0272 315/193 |
| 2012/0321296 A1* | 12/2012 | Wellbrock | H04B 10/038 398/5 |
| 2013/0223334 A1* | 8/2013 | Guo | H04W 84/18 370/328 |
| 2015/0296599 A1 | 10/2015 | Recker et al. | |
| 2015/0312394 A1 | 10/2015 | Mirza et al. | |
| 2016/0021723 A1 | 1/2016 | Huizenga et al. | |
| 2016/0135241 A1* | 5/2016 | Gujral | H04W 4/70 370/328 |
| 2016/0187231 A1* | 6/2016 | Rho | G01M 99/007 702/182 |
| 2016/0234756 A1* | 8/2016 | Alanen | H04W 4/14 |
| 2016/0255521 A1* | 9/2016 | Zhang | H04L 12/2809 370/252 |
| 2016/0286629 A1* | 9/2016 | Chen | H05B 37/0272 |
| 2016/0330825 A1* | 11/2016 | Recker | H05B 37/0272 |
| 2017/0208079 A1* | 7/2017 | Cammarota | H04L 63/10 |
| 2017/0215261 A1* | 7/2017 | Potucek | A61H 33/005 |
| 2017/0235783 A1* | 8/2017 | Chen | H04W 4/70 707/691 |

\* cited by examiner

LINKED SECURITY LIGHTING SYSTEM AND METHODS

TECHNICAL FIELD

The embodiments described herein generally to a lighting system having multiple linked lighting units. More specifically, the embodiments relate to a security lighting system that includes a plurality of networked lighting units each having motion sensors and ambient light sensors. Each lighting unit can be connected and controlled through a user interface provided on each lighting unit.

BACKGROUND

Outdoor security lighting can be used for both residential and commercial environments. Many security lighting systems are directly connected to a wired power source and function to illuminate large areas in response to movement detected by a proximity and/or motion sensors. In many security lighting systems, each lighting unit functions individually based upon the zone of motion and illumination that its sensors are capable of detecting. Thus, when one lighting unit of a system detects motion or nighttime, only that single unit illuminates in response to the external stimulus. Furthermore, many lighting units suffer from a variety of drawbacks, including complexity of configuration for the user and difficulty establishing network communications. In many systems, the user is required to hardwire individual lighting units together, which can require considerable installation time and expense.

SUMMARY

The present disclosure is directed to systems, methods, and apparatuses for providing a security lighting system having a plurality of linked lighting units. In some embodiments, a method is set forth for operating a lighting device in a network of lighting devices. The method can be performed by a first lighting device in the network of lighting devices. The method can include steps of determining that an amount of ambient light affecting a sensor of the first lighting device is outside of a threshold for activating a light of the first lighting device, and receiving a detect signal from a second lighting device in the network of lighting devices. The method can also include steps of activating the light of the first lighting device in response to receiving the detect signal, and initiating a timer for the light. The timer can be set according to an operating mode of the first lighting device and the light can be unresponsive to the sensor while the timer is active. In some embodiments, the method can also include steps of detecting, by the motion sensor, a motion event; adjusting a luminance level of the light in response to detecting the motion event; and transmitting a motion detect signal to the second lighting device.

In other embodiments, a computing device is set forth. The computing device can include a light, a sensor configured to provide an output in response to detecting an event, and a transmitter configured to communicate with a network of lighting devices. The computing device can also include one or more processors connected to the light, the sensor, and the transmitter, and one or more memory devices. The memory device can store instructions that include steps of receiving a selection of (i) a manual operating mode and (ii) an output level for the light. The steps can also include receiving, via the transmitter, a detect signal from a first lighting device that is connected to a network of lighting devices. In accordance with the operating mode, the output level of the light can be unresponsive to both the detect signal and the output from the sensor. The steps can also include transmitting, via the transmitter, the detect signal to a second lighting device in the network of lighting devices. Transmitting the detect signal can occur after a predetermined delay period has transpired for preventing signal collisions over the network of lighting devices.

In yet other embodiments, a system is set forth. The system can include a sensor responsive to an event occurring at a location, and a transmitter configured to operate over multiple channels that include a first channel to which a first lighting device can be connected, and a second channel to which a second lighting device can be connected. The system can also include a processor connected to the sensor and the transmitter. The processor can be configured to severally operate in a first operating mode and a second operating mode. The first operating mode can cause the transmitter to provide test signals over the first channel and the second channel to identify a least error prone channel. The second operating mode can cause the transmitter to exclusively provide a signal over the least error prone channel to the first lighting device or the second lighting device. The signal can be provided in response to a detected event occurring at the location. In some embodiments, the system can include an interface that includes: a first selector switch that is configured to cause the transmitter to transition between the first channel and the second channel, and a second selector switch that is configured to cause the processor to transition between the first operating mode and the second operating mode.

For purposes of the instant specification the term "security lighting system" or "lighting system" is used herein to refer to an implementation or arrangement of one or more linked lighting units in a particular form factor, assembly, or package. The term "security light" or "lighting unit" is used herein to refer to an apparatus including one or more light sources of same or different types. A given lighting unit can have any one of a variety of mounting arrangements for the light source(s), enclosure/housing arrangements and shapes, and/or electrical and mechanical connection configurations. Additionally, a given unit optionally can be associated with (e.g., include, be coupled to and/or packaged together with) various other components (e.g., control circuitry) relating to the operation of the light source(s).

Additionally the term "controller" is used herein generally to describe various apparatus relating to the operation of one or more light sources. A controller can be implemented in numerous ways (e.g., such as with dedicated hardware) to perform various functions discussed herein. A "processor" is one example of a controller, which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION OF THE INVENTION

Figure 1:
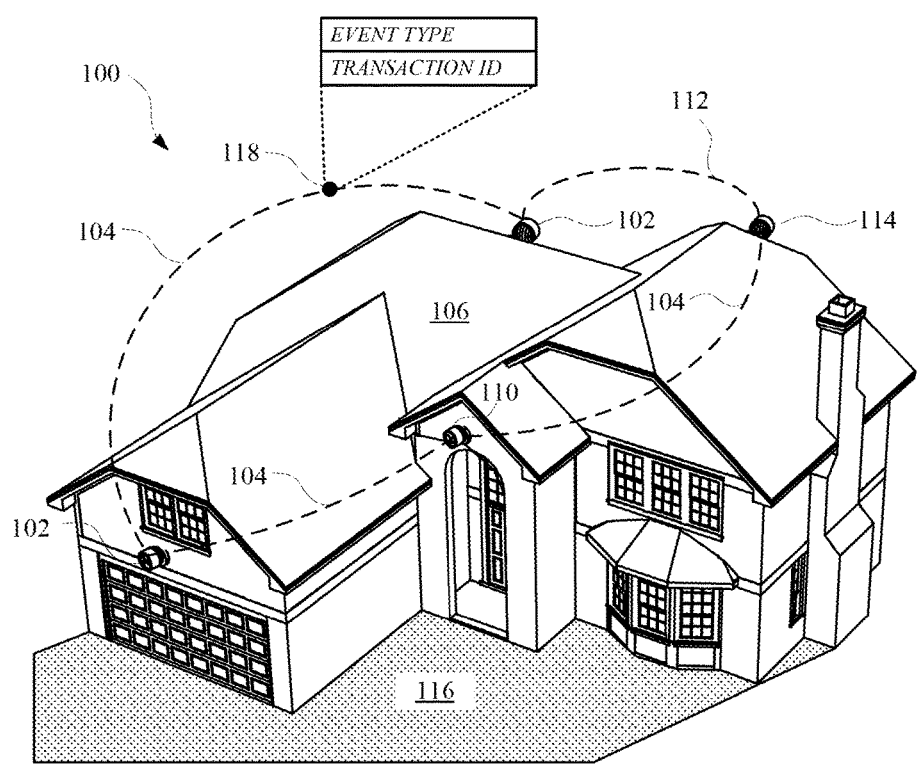
FIG. 1 illustrates a perspective view of a home with a security lighting system that includes multiple wirelessly connected lighting units.

In outdoor lighting applications it is often desirable to have a plurality of remotely placed lighting units capable of detecting ambient light via an ambient light sensor and detecting a motion event via a motion sensor. In many applications, it can be desirable to activate all lights in the security system when a motion event or night is detected at a single unit. The security lighting system described herein allows a user to link multiple remotely placed lighting units using an interface of at least one of the lighting units. Various embodiments disclosed herein relate to providing a security lighting system having remotely located lighting units that can be wirelessly networked from any individual lighting unit. An entire network of lighting units can thereafter be responsive to stimuli sensed at any of the individual lighting units. Each lighting unit can be wirelessly connected to an existing network of lighting units through a user interface on each lighting unit, respectively, and/or using a separate wireless user interface. In this way, a security lighting system with multiple lighting units can be readily expanded to include additional lighting units without requiring installation of network cables or a server to provide connectivity for individual lighting units.

Each lighting unit of a security lighting system can operate in a dual bright mode whereby the illumination level of a lighting unit can be customized based upon whether a lighting unit of the security lighting system has detected a nighttime event and/or a motion event. For example, the illumination level can be set at a first level when a nighttime event is detected, and a second level, that is greater than the first level, when the motion event is detected. Furthermore, each lighting unit of the security lighting system can function as a master unit or slave unit. While operating as a master unit, a lighting unit can provide wireless commands to other lighting units, and while operating in as a slave unit, a lighting unit can follow commands sent by other lighting units. Each lighting unit can control its own dual bright settings or, alternatively, these settings may be changed remotely by a command sent by another lighting unit or remote device.

The security lighting system can operate such that a detect signal can be provided to each lighting unit when any one lighting unit has detected a valid motion event using a motion sensor of the lighting unit. Data based on a sensor of a lighting unit can be provided to each of the other lighting units in the security lighting system using a unique transaction identification (ID). A transaction ID can provide information about the lighting unit that originated the data and/or detected the event. This information can then be repeated and/or rebroadcasted to the other lighting units in the security lighting system so that each lighting unit can respond to the detected event according to the settings of each lighting unit. The information can include temporal data that identified when an event was detected, geographic data that identifies a location of the lighting unit that detected the event, historical data related to previous events that have been detected by the lighting unit, and/or any other data suitable for operating a security lighting system. In some embodiments, signals transmitted between lighting units can include: a unique message start identifier, a source address identifying the lighting unit that initiated a command, one or more network addresses that identify one or more lighting units, a maximum hop count identifying the maximum number of lighting units the signal can be sent to, a unique transaction identification for each event being transmitted, and/or a command or out code that can identify a type of event being communicated such as a motion detect event, night detect event, and/or a system set parameter.

In some embodiments, each lighting unit can include a networking capability that permits each lighting unit to learn and/or detect each of the other lighting units in the security lighting system. Furthermore, each lighting unit can individually acknowledge receipt of event-related signals and/or commands while connected to one or more other lighting units in the security lighting system. For example, a valid motion (VM) signal from an individual lighting unit can be transmitted to each lighting unit in the security lighting system, which can result in a response signal being generated at each lighting unit in the entire security lighting system.

In some embodiments, the security lighting system can reciprocate a VM signal from an individual lighting unit of the security lighting system after at least one lighting unit in the security lighting system provides a night detect signal. This can cause each light in the security lighting system to turn on at a first luminance level in response to receiving the night detect signal, and a second level in response to receiving the VM signal.

In yet other embodiments, the security lighting system can provide wireless signals to a remote device, such as a chime or a visual indicator (e.g., a lamp or light emitting diode), and/or a programmed alert in a graphical user interface (GUI). In this way, the security lighting system can provide a user with a remote indication of a VM event from any lighting unit in the security lighting system. This feature is particularly advantageous for users who have hearing or vision impairments, and/or who are located remotely from one or more of the lighting units in the security lighting system.

In the following detailed description, for purposes of explanation and not limitation, representative embodiments disclosing specific details are set forth in order to provide a thorough understanding of the claimed invention. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatus and methods may be omitted so as to not obscure the description of the representative embodiments. Such methods and apparatus are clearly within the scope of the claimed invention. For example, aspects of the methods and apparatus disclosed herein are described in conjunction with a security light unit having a housing and having one or more light heads with various illumination sources. However, one or more aspects of the methods and apparatus described herein may be implemented in other units that have alternative configurations. For example, aspects described herein may be implemented in security light units wherein the illumination sources and/or other components are not enclosed in a housing. Also, for example, aspects described herein may be implemented in units wherein power may be provided to one or more of the components of the security light unit through various electrical connections that are not engageable with a standard illumination sources. Implementation of the one or more aspects described herein in alternatively configured environments is contemplated without deviating from the scope or spirit of the claimed invention.

FIG. 1 illustrates a perspective view 100 of a home 106 with a security lighting system that includes multiple wirelessly connected lighting units. The lighting units can be connected over a wireless connection 104. The connection can be established in part using an interface provided at each lighting unit, or at a remote controller. For example, a first lighting unit 102 can be connected to a second lighting unit 110 at the front of the home 106 over the wireless connection 104, and a third lighting unit 112 and a fourth lighting unit 114 at the back of the home 106 can also share the wireless connection 104. The interface of each lighting unit can allow a user to select between channels over which the lighting units can communicate. For example, the first lighting unit 102 and the second lighting unit 110 at the front of the home 106 can connected over a first channel, and the third lighting unit 112 and the fourth lighting unit 114 can be connected over a second channel that is different than the first channel. Under this separate channel arrangement, changes to the operation of lighting units at the front of the home 106 will not affect the operation of lighting units at the back of the home. It should be noted that a channel can refer to a frequency or frequencies over which wireless signals are transmitted between lighting units.

In some embodiments, each lighting unit can include one or sensor that can be used to detect events that affect an environment of each lighting unit. The sensor can include proximity sensors, ambient light sensors, motion sensors, audio sensors, visual sensors, temperature sensors, infrared sensors, chemical sensors, location sensors, and/or any other sensor suitable for providing environmental data. When the lighting units are connected over the wireless connection 104, data related to events detected by the sensors can be shared among all the lighting units in the security lighting system. For example, as night time approaches, a shadow 116 can be cast over portions of the home 106, affecting a measurement of an ambient light sensor of each of the first lighting unit 102 and the second lighting unit 110. Ambient light sensors of the third lighting unit 112 and fourth lighting unit 114 may not be affected by the shadow 116 because they are facing away from the shadow 116 and, possibly, towards the sun. In response, when an amount of detected ambient light reaches a predetermined threshold stored by the first lighting unit 102, the first lighting unit 102 can communicate a night detect signal to the second lighting unit 110, the third lighting unit 112, and the fourth lighting unit 114. Thereafter, each of the second lighting unit 110, the third lighting unit 112, and the fourth lighting unit 114 can turn on with the first lighting unit 102.

In some embodiments, each of the lighting units of the security lighting system can include one or more timers that operate to limit an amount of time that a light of each lighting unit is on. Each lighting unit can include a night detect timer, a motion event timer, a test mode night timer, a test mode motion timer, a manual mode timer, and/or any other timers suitable for controlling a light of a lighting unit. In some embodiments, a lighting unit can include multiple timers that are each associated with different sensors of the lighting unit.

Motion detect signals and night detect signals from a lighting unit can affect timers of other lighting units in the security lighting system. For example, when the first lighting unit 102 detects a motion event, the first lighting unit 102 can send a motion detect signal 118 to each of the second lighting unit 110, third lighting unit 112, and fourth lighting unit 114. However, in some embodiments, the motion detect signal can be re-transmitted by the second lighting unit 110 or third lighting unit 112 to the fourth lighting unit 114, so that the first lighting unit 102 does not have to send the motion detect signal directly to the fourth lighting unit 114. The motion detect signal can include data that identifies the event type (e.g., a motion event) and a unique transaction identifier (ID). In response to receiving the motion detect signal, the lighting units can turn on their respective lights and initiate a timer that can cause the light to turn off when the timer expires (e.g., after 15 seconds). In this way, each lighting unit in the security lighting system will turn on and off at approximately the same time when at least one motion sensor of one lighting unit detects motion. In some embodiments, in addition to a light output, each lighting unit can provide an audible output, a visual output, and/or a tactile output, to alert a user to a motion event, a night event, and/or a potential security issue. This feature can be especially useful for users who may have a hearing or vision impairment.

In some embodiments, each timer of each lighting unit can be reset as long as at least one of the lighting units is detecting motion. For example, after the first lighting unit 102 detects a first motion event and sends a first motion detect signal to the other lighting units in the security lighting system, the second lighting unit 110 can detect a second motion event. The second lighting unit 110 can then send a second motion detect signal to the other lighting units in the security lighting system. If the second motion detect signal is received by the other lighting units before their respective timers expire from the first motion detect signal, the timers will reset in response to the second motion detect signal, because the second motion event is unique from the first motion event. Otherwise, if the timers initiated by the first motion detect signal have already expired, the second motion detect signal will reinitialize the timers.

In some embodiments, different timers can be initiated by different events and/or different signals. For example, the first lighting unit 102 can send out a night detect signal that initiates a first timer that lasts for a first time period for the other lighting units in the security lighting system. Thereafter, when the first lighting unit 102 detects a motion event, the first lighting unit 102 can send out a motion event detect signal that initiates a second timer that lasts for a second time period for the other lighting unit. The first time period can be longer, shorter, or equal to the second time period. Furthermore, the first timer can terminate in response to the initiation of the second timer or run in parallel with the second timer.

In some embodiments, each of the lighting units can operate in a test mode. The test mode can be initiated using an interface located at each of the lighting units. For example, the first lighting unit 102 can include an electronic switch that allows the first lighting unit 102 to be switched from a normal operating mode, a dual bright mode, a test mode, and/or a manual mode. When in the test mode, a lighting unit can operate according to shorter timers compared to the normal operating mode. For example, when the first lighting unit 102 detects a motion event while in the test mode, the light of the first lighting unit 102 will illuminate for a shorter time period relative to when a motion event is detected in the normal operating mode. Furthermore, when in the test mode, the first lighting unit 102 can send motion detect test mode signals and night detect test mode signals to other lighting units in the security lighting system. When another lighting unit, such as the second lighting unit 110, receives a motion detect test mode signal and/or a night detect test mode signal, the other lighting unit can respond by illuminating for a period of time that is determined by the mode of the other lighting unit. For example, if the other lighting unit is also in a test mode, the other lighting unit will illuminate for a shorter period of time relative to a period of time associated with a normal operating mode. However, in some embodiments, the other lighting unit can illuminate for a shorter period of time relative to the time period associated with the normal operating mode regardless of the operating mode of the other lighting unit. Alternatively, if the other lighting unit is in the normal operating mode and receives a motion detect test mode signal and/or a night detect test signal, the other lighting unit can illuminate according to its motion detect time or night detect timer for the normal operating mode.

Test mode signals can be initiated by a single light unit and repeated by other lighting units in order that each lighting unit in the security lighting system will receiving the test mode signals. This allows for the testing of all lighting units in a security lighting system to be initiated from a single lighting unit. The test mode can be used to identify a channel that will cause the least amount of errors when communicating signals between lighting units. The test mode can also be used to test various operating modes and sensors of the lighting units. For example, the first lighting unit 102 can be switched from a normal operating mode to a test mode by the user. Thereafter, the user can cover an ambient light sensor of the first lighting unit 102 to simulate a night time event by preventing the ambient light sensor from detecting light. In response to detecting the simulated night event, the first lighting unit 102 can send a night detect test mode signal to the second lighting unit 110 and/or the third lighting unit 112. The second lighting unit 110 and/or the third lighting unit 112 can repeat the night detect test mode signal to the fourth lighting unit 114. When each of the second lighting unit 110, third lighting unit 112, and fourth lighting unit 114 receive the night detect test mode signal, they can cause their respective lights to illuminate. Levels of illumination for each lighting unit can depend on the signal received. For example, a signal corresponding to a test mode signal (e.g., a night detect test mode signal) can cause each lighting unit to illuminate at full brightness, whereas a normal night detect signal can cause each lighting unit to illuminate at less than full brightness (i.e., dim brightness level).

When signals are repeated and/or re-transmitted between lighting units, each unit can employ network capabilities that prevent signal collisions between lighting units. For example, each lighting unit can be programmed to not transmit a signal unless the lighting unit has determined that the channel on which the lighting unit is connected has been idle for a predetermined period of time or a random period of time. In some embodiments, a lighting unit can be programmed to listen for signals from other lighting units for a predetermined period of time before transmitting a signal to another lighting unit in order to avoid collisions on a channel. Furthermore, each lighting unit can be assigned a random back-off time for a data transmission, in order to reduce the likelihood of network data collisions and minimize data transmission errors. In other embodiments, each lighting unit can be programmed to send requests and/or approvals to other lighting units before a detect signal is transmitted between lighting units. For example, the first lighting unit 102 can detect a motion event and, before transmitting a motion detect signal, send a request signal to the second lighting unit 110. If the second lighting unit 110 has not received a signal from another lighting unit within a threshold period of time, the second lighting unit 110 can respond with an approval signal indicating that the first lighting unit 102 is approved to send the motion detect signal to the second lighting unit 110. However, if the second lighting unit 110 has received a signal from another lighting unit within the threshold period of time, the second lighting unit 110 can respond with a request denied signal. The request denied signal can include information about the last signal received by the second lighting unit 110 and/or a time to try again. Each detect signal can be made unique when originally transmitted in order that no duplicate detect signals will exist in the wireless connection 104 that connects each of the lighting units.

In some embodiments, each lighting unit can be transitioned into a manual mode (i.e., a manual override mode) that allows a lighting unit to operate independent of other lighting units in a security lighting system despite still being connected to the other lighting units. While in the manual mode, a lighting unit can cease sending detect signals that are based on events detected by a sensor of the lighting unit. Furthermore, while in the manual mode, the lighting unit will not adjust a luminance level of a light of the lighting unit in response to an event detected by a sensor of the lighting unit. However, while operating in the manual mode, the lighting unit can re-transmit detect signals received from other lighting units that are connected by the wireless connection 104. For example, if the first lighting unit 102 is in the manual mode and the second lighting unit 110 detects a motion event, the second lighting unit 110 can transmit a motion detect signal to the first lighting unit 102. In response, the first lighting unit 102 can re-transmit the motion detect signal to the third lighting unit 112 and/or the fourth lighting unit 114 via the wireless connection 104. The motion detect signal can cause the third lighting unit 112 and/or the fourth lighting unit 114 to change luminance levels, but will not change a luminance level of the first lighting unit 102 because the first lighting unit 102 is operating in the manual mode.

Figure 2:
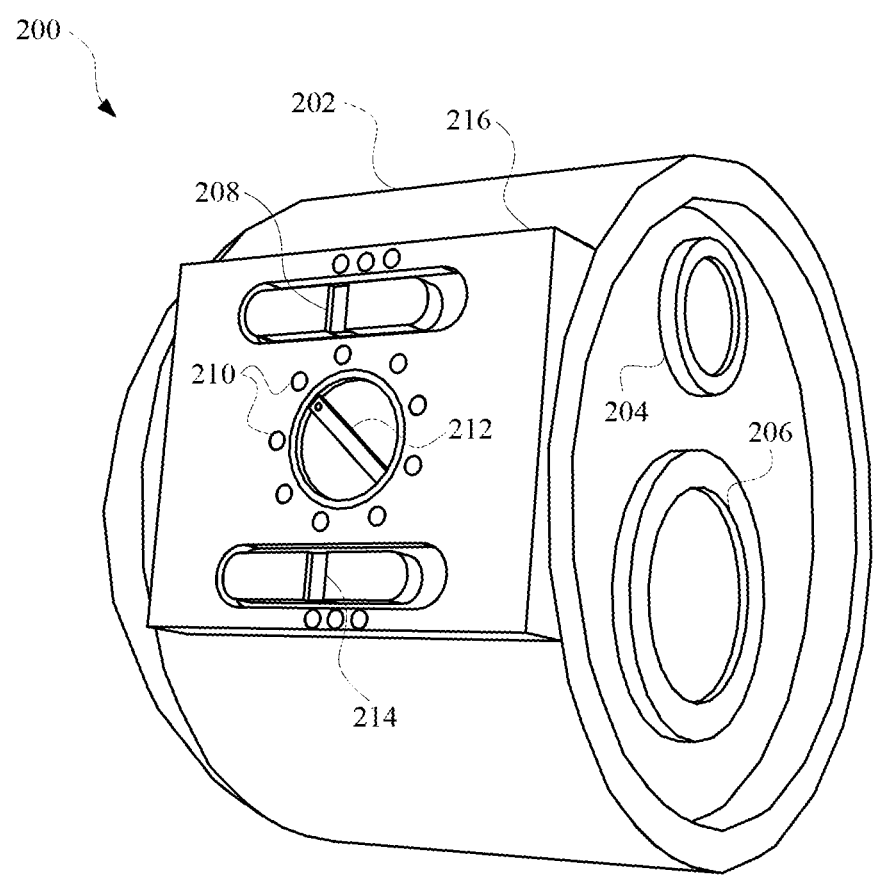
FIG. 2 illustrates a perspective view of a lighting unit that can be connected to a security lighting system as discussed herein.

FIG. 2 illustrates a perspective view of a lighting unit 200 that can be connected to a security lighting system as discussed herein. The lighting unit 200 can include a housing 202 that encapsulates a system of the lighting unit 200 that performs many of the programmed functions of the lighting unit 200. The lighting unit 200 can include one or more lights 206 that can operate according to a variety of programmable parameters. For example, the lights 206 can operate according to an adjustable luminance, color temperature, and/or any other adjustable variable for controlling an operation of a light. The lighting unit 200 can also include one or more sensors 204. The sensors 204 can be active and/or passive sensors, or a combination thereof. The sensors 204 can include a proximity sensors, an ambient light sensor, a motion sensor, an audio sensor, a visual sensor, a temperature sensor, an infrared sensor, a chemical sensor, a location sensor, and/or any other sensor suitable for providing environmental data to the lighting unit. Data derived from the sensors 204 can be used to make adjustments to the operation of the lights 206. The lighting unit 200 can further include an interface 216 for adjusting operations of the lighting unit 200. The interface 216 can include a first selector switch 208, which can be used to manually adjust a brightness of the lights 206 when the lighting unit 200 is operating in the manual mode, test mode, and/or a normal operating mode. Additionally, in some embodiments, the first selector switch 208 can be used to turn off the lights 206 of the lighting unit 200 while leaving on other components of the lighting unit 200. For example, the lights 206 of the lighting unit 200 can be turned off at the first selector switch 208 but the lighting unit 200 can still be connected to other lighting units in a security lighting system. Furthermore, while the lights 206 are off, the lighting unit 200 can operate to re-transmit various detect signals being transmitted by other lighting units, thereby expanding a network of the security lighting system. The interface 216 can also include a second selector switch 212, which can be a rotary selector switch. The second selector switch 212 can allow a user to manually connect the lighting unit 200 to a channel by simply turning the second selector switch 212 toward a channel identifier 210. The channel identifiers 210 can correspond to the channels available to the lighting unit 200 for establishing a wireless connection with one or more other lighting units. The channels can correspond to one or more frequencies available to the lighting unit 200 for communicating wireless signals between lighting units. These channels can be analyzed during the test mode when the lighting unit 200 sends test signals over the channels to other light units, as discussed herein.

The interface 216 can further include a third selector switch 214 that can be used to change operating modes of the lighting unit 200. For example, the third selector switch 214 can include options to switch the lighting unit 200 to an off mode, a test mode, a normal operating mode, a manual mode, a dual bright mode, and/or any other mode suitable for governing a light. When switching the lighting unit 200 from the off mode to the dual bright more or normal operating mode, the lighting unit 200 can connect to a channel corresponding to a channel that is selected by the second selector switch 212. This allows the task of connecting additional lights to a network or channel to be performed simply by moving a switch, as opposed to using some remote network interface. When switching the lighting unit 200 from the off mode to the test mode, the lighting unit 200 can connect to one or more channels and allow a user to test various features of the lighting unit 200, as well as other lighting units connected to the channel, as discussed herein. When switching the lighting unit 200 from the off mode to the manual mode, the lighting unit 200 can connect to a channel and operate according to the first selector switch 208. Furthermore, the sensors 204 can operate during the manual mode, but the sensors 204 can be prevented from affecting an output of the lights. The lighting unit 200 can also relay signals between other lighting units of a security lighting system when operating in the manual mode.

When switching the lighting unit 200 from the off mode to the dual bright mode, the sensors 204 of the lighting unit 200 can affect an output of the lights 206 according to the sensor that is detecting an event, and/or characteristics of the event. For example, the lighting unit 200 can include a motion sensor and an ambient light sensor. When the lighting unit 200 detects a night event at the ambient light sensor (e.g., when an amount of ambient light is outside of a threshold for a predetermined period of time), the lights 206 of the lighting unit 200 can be turned on at a first luminance level. Thereafter, while lights 206 are illuminated, if the motion sensor is triggered by a motion event, the lights 206 can be illuminated at a second luminance level that is higher or lower than the first luminance level. Furthermore, any other lighting units that are in the dual bright mode and connected to the lighting unit 200 can transition between luminance levels in the same way upon receipt of such detect signals from the lighting unit 200. However, if one of the other lighting units is in the manual mode, the lighting unit in the manual mode will not be affected by the receipt of the detect signals.

Figure 3:
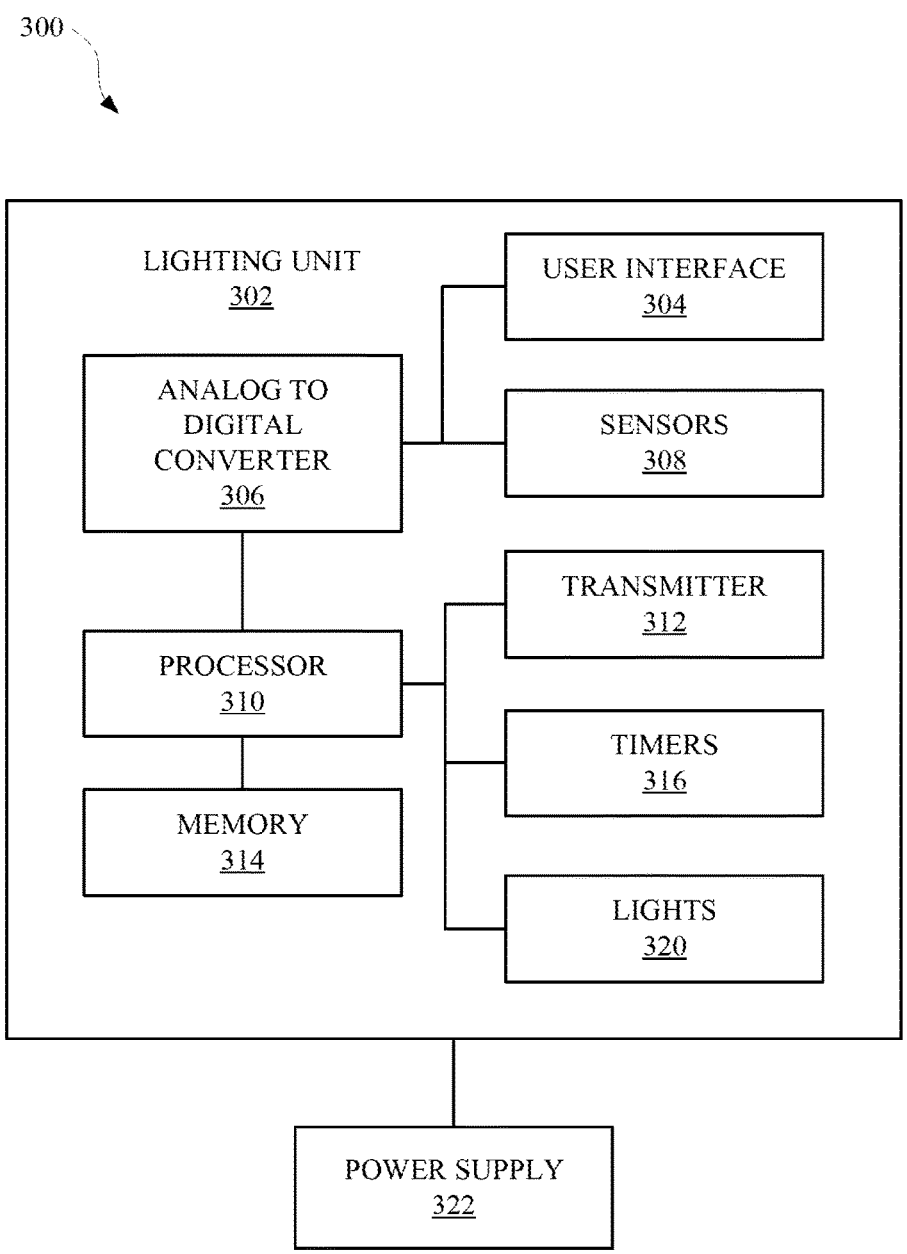
FIG. 3 illustrates a system diagram of a lighting unit that can be connected to a security lighting system according to any of the embodiments discussed herein.

FIG. 3 illustrates a system diagram 300 of a lighting unit 302 that can be connected to a security lighting system according to any of the embodiments discussed herein. The system diagram 300 identifies components of the lighting unit 302 that can be embodied as one or more hardware and/or software components of the lighting unit 300. The lighting unit 302 can include one or more processors 310 connected to one or more memory 314 devices. The memory 314 can store instructions and parameters, such as thresholds and timer values, for the lighting unit 302. The processor 310 can be powered directly or indirectly by a power supply 322 that can be internal or external to the lighting unit 302. For example, the power supply 322 can be grid power from a local utility power supplier or a charge storage device located inside of the lighting unit 302. Power from the power supply 322 can be separately supplied to the processor 310 and lights 320. The lights 320 can be connected to a pulse-width modulated (PWM) driver circuit that conditions that power from the power supply 322 separately than what may be required by the processor 310.

The lighting unit 302 can further include a user interface 304, such as interface 216, which can allow a user to change operations of the lighting unit 302. The user interface 304 can include options for changing channels of the lighting unit 302, operating modes of the lighting unit 302, brightness of the lights 320, and/or any other operating parameters of the lighting unit 302. The lighting unit 302 can also include one or more different sensors 308 for detecting different environmental conditions affecting the lighting unit 302. The user interface 304 and the sensors 308 can optionally be connected to an analog to digital converter (ADC) 306. The ADC 306 can convert analog signals from the user interface 304 and/or the sensors 308 and convert them into digital signals for the one or more processors 310. The processor 310 can generate detect signals and/or change operations of the lighting unit 302 in response to receiving the digital signals from the ADC 306.

The lighting unit 302 can further include a transmitter 312 for communicating signals between lighting units, as well as any other remote device suitable for communicating with the lighting unit 302. The transmitter 312 can include a processor interface for communicating with the processor 310, and transmission and receiving capabilities. The transmitter 312 can operate to avoid signal collisions, as discussed herein. Furthermore, the lighting unit 302 can include one or more transmitters 312 for communicating according to one or more different wireless protocols. For example, the lighting unit 302 can use one or more transmitters 312 to communicate via Bluetooth, Wi-Fi, LTE, and/or any other protocol suitable for connecting computing devices.

Furthermore, the lighting unit 302 can include one or more timers 316 that can influence an on time of the lights 320. Parameters for the timers 316 can optionally be stored in memory 314 in association with certain operating modes of the lighting unit 302. For example, a timer period for the test mode can be stored as 5 seconds, and a timer period for the normal operating mode or dual bright mode can be stored as 5 minutes. Furthermore, the memory 314 can store parameters for controlling the lights 320 according to certain operating modes. For example, a single luminance level can be stored in association with the test mode, whereas multiple luminance levels can be stored in association with the dual bright mode.

Figure 4:
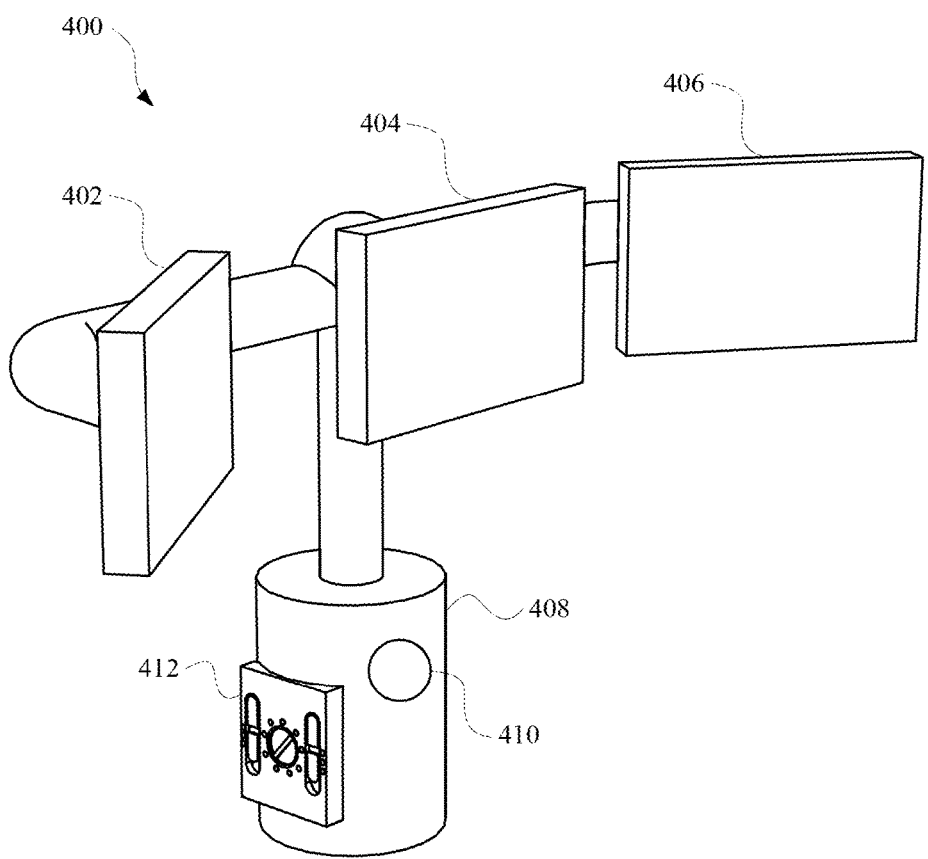
FIG. 4 illustrates a perspective view of a lighting unit having multiple lights that are oriented in different directions.

FIG. 4 illustrates a perspective view of a lighting unit 400 that can be incorporated into any of the lighting networks discussed herein. The lighting unit 400 can include multiple lights that are oriented in different directions. For example, the lighting unit 400 can include a first light 402, a second light 404, and a third light 406. Each light can be connected to a housing 408 of the lighting unit 400, which can contain many of the components for controlling the lights and communicating with other lighting units. For example, the housing 408 can include one or more of the components described with respect to lighting unit 302. The lighting unit 400 can further include an interface 412, which can include the features of interface 216 and operate to control lights, as described with respect to interface 216. Additionally, the lighting unit 400 can include one or more sensors 410, which can cause changes to the operations of the lights based on events detected by the sensors 410. For example, multiple of the lighting units 400 can be included in the security lighting system of FIG. 1, and be connected over the wireless connection 104. Illumination of the first light 402, the second light 404, and/or the third light 406 can depend on where in the security lighting system an event is detected. For example, the first light 402 can face a motion event (e.g., a person moving) that is being detected by a lighting unit separate from the lighting unit 400 that includes the first light 402. The detecting lighting unit can then send a motion detect signal to the lighting unit 400. In response, because the first light 402 is facing the motion event, the first light 402 can be illuminated more than the second light 404 and the third light 406, which would not be facing the motion event. This response can scheduled by the lighting unit 400 using location data of the other lighting units in the security lighting system. Thereafter, if a subsequent motion event is detected by the lighting unit 400, the second light 404 and the third light 406 can also be illuminated as much as the first light 402.

Figure 5:
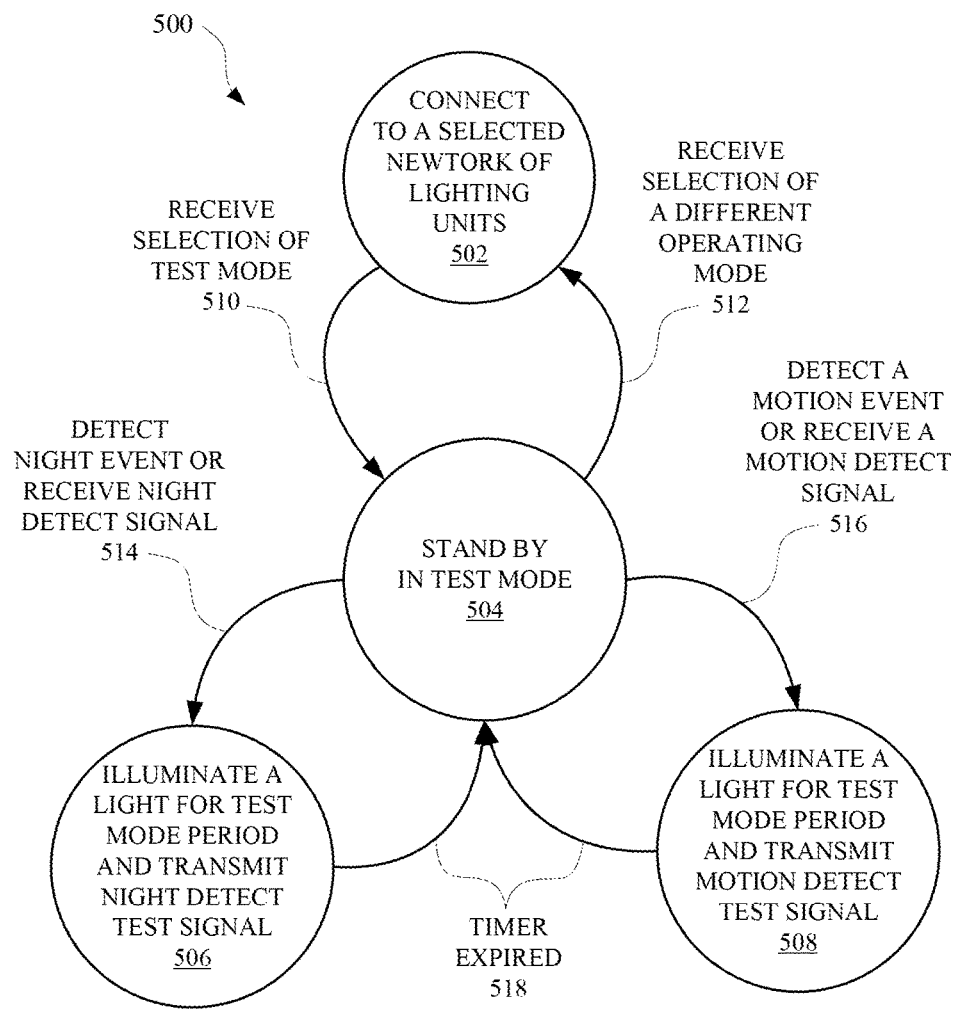
FIG. 5 illustrates a state diagram for operating a lighting unit in a test mode according to any of the embodiments discussed herein.

FIG. 5 illustrates a state diagram 500 for operating a lighting unit in a test mode according to any of the embodiments discussed herein. The state diagram 500 can be embodied as hardware and/or software in a lighting unit, a remote device capable of controlling one or more lighting units, and/or any other device suitable for controlling a light. The state diagram 500 can include a state 502 where the lighting unit is connected to a selected network of lighting units. The lighting units can be part of a security lighting system that includes wirelessly connected lighting units. When the lighting unit receives a selection of a test mode at transition 510, the lighting unit can transition to a state 504 where the lighting unit is operating in the test mode. The transition 510 can be initiated by a user that is controlling the lighting unit from a user interface or a remote device capable of controlling the lighting unit. While in the test mode, the lighting unit can detect a night event or receive a night detect signal at transition 514. As a result, the lighting unit can transition to state 506 where the lighting unit illuminates one or more lights for a test mode period and transmits a night detect test signal to other lighting units connected in the selected network of lighting units. The transmission of the night detect test signal can be performed over multiple different channels, regardless of a channel selected by a user, between the lighting unit and the other lighting units. Once a timer, operating according to the test mode period, expires at transition 518, the lighting unit can transition back to state 504 where the lighting unit is standing by in the test mode. While in the test mode, the lighting unit can also detect a motion event or receive a motion detect signal at transition 516. In response, the lighting unit can transition into state 508 where the lighting unit illuminates one or more lights for a test mode period and transmits a motion detect test signal to other lighting units connected in the selected network of lighting units. The transmission of the motions detect test signal can be performed over multiple different channels, regardless of a channel selected by a user, between the lighting unit and the other lighting units. Once a timer, operating according to the test mode period, expires at transition 518, the lighting unit can transition back to state 504 where the lighting unit is standing by in the test mode. The lighting unit can transition out of the test mode at transition 512 when a selection of a different operating mode is received at the lighting unit.

Figure 6:
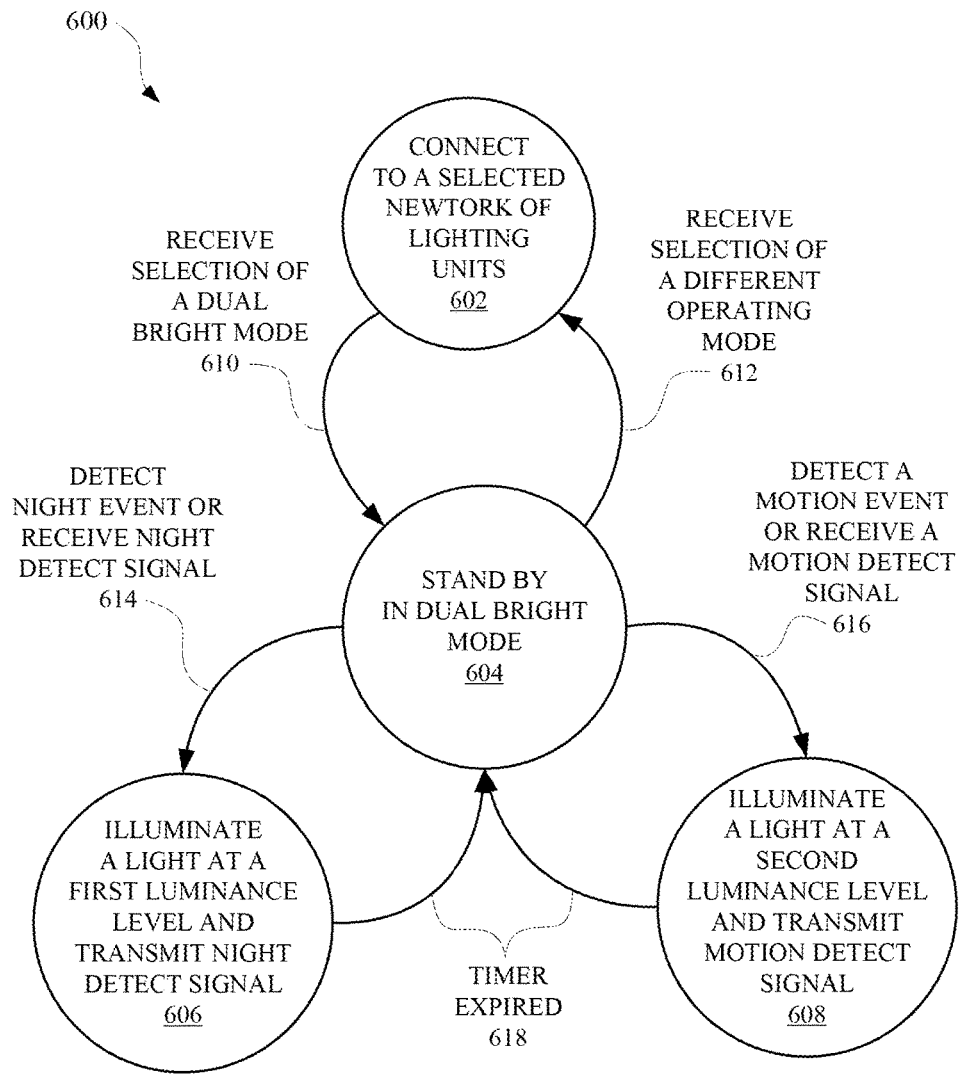
FIG. 6 illustrates a state diagram for operating a lighting unit in a dual bright mode according to any of the embodiments discussed herein.

FIG. 6 illustrates a state diagram 600 for operating a lighting unit in a dual bright mode according to any of the embodiments discussed herein. The state diagram 600 can be embodied as hardware and/or software in a lighting unit, a remote device capable of controlling one or more lighting units, and/or any other device suitable for controlling a light. The state diagram 600 can include a state 602 where the lighting unit is connected to a selected network of lighting units. The lighting units can be part of a security lighting system that includes wirelessly connected lighting units. When the lighting unit receives a selection of a dual bright mode at transition 610, the lighting unit can transition to a state 604 where the lighting unit is operating in the dual bright mode. The transition 610 can be initiated by a user that is controlling the lighting unit from a user interface or a remote device capable of controlling the lighting unit. While in the dual bright mode, the lighting unit can detect a night event or receive a night detect signal at transition 614. As a result, the lighting unit can transition to state 606 where the lighting unit illuminates one or more lights at a first luminance level and transmits a night detect signal to other lighting units connected in the selected network of lighting units. Once a timer, operating with an expiration defined by the dual bright mode, expires at transition 618, the lighting unit can transition back to state 604 where the lighting unit is standing by in the dual bright mode. While in the dual bright mode, the lighting unit can also detect a motion event or receive a motion detect signal at transition 616. In response, the lighting unit can transition into state 608 where the lighting unit illuminates one or more lights at a second luminance level, which can be higher or lower than the first luminance level, and transmits a motion detect test signal to other lighting units connected in the selected network of lighting units. Once a timer, operating with an expiration defined by the dual bright mode, expires at transition 618, the lighting unit can transition back to state 604 where the lighting unit is standing by in the dual bright mode. The lighting unit can transition out of the dual bright mode at transition 612 when a selection of a different operating mode is received at the lighting unit. For example, a selection of a test mode can be made, in which case the lighting unit would operate thereafter according to state diagram 500.

Figure 7:
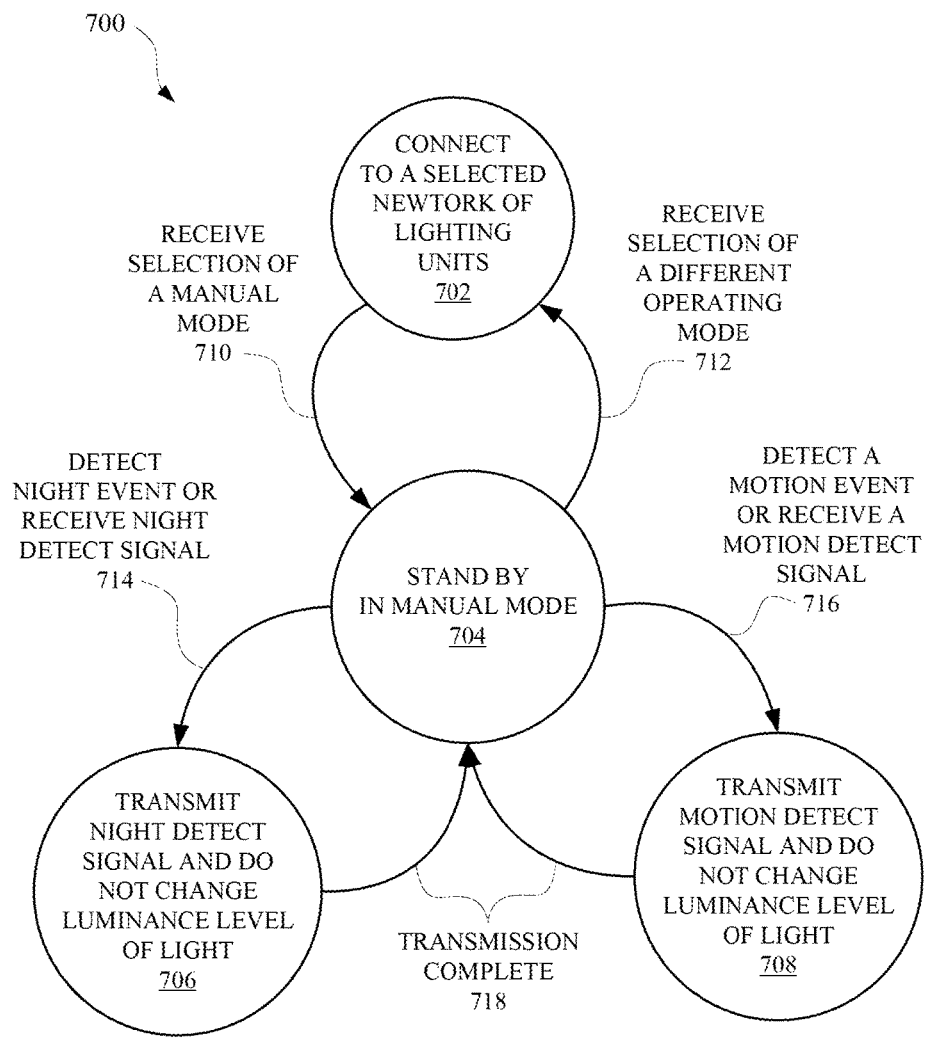
FIG. 7 illustrates a state diagram for operating a lighting unit in a manual mode according to any of the embodiments discussed herein.

FIG. 7 illustrates a state diagram 700 for operating a lighting unit in a manual mode according to any of the embodiments discussed herein. The state diagram 700 can be embodied as hardware and/or software in a lighting unit, a remote device capable of controlling one or more lighting units, and/or any other device suitable for controlling a light. The state diagram 700 can include a state 702 where the lighting unit is connected to a selected network of lighting units. The lighting units can be part of a security lighting system that includes wirelessly connected lighting units. When the lighting unit receives a selection of a manual mode at transition 710, the lighting unit can transition to a state 704 where the lighting unit is operating in the manual mode. The transition 710 can be initiated by a user that is controlling the lighting unit from a user interface or a remote device capable of controlling the lighting unit. While in the manual mode, the lighting unit can detect a night event or receive a night detect signal at transition 714. As a result, the lighting unit can transition to state 706 where the lighting unit transmits a night detect signal to other lighting units connected in the selected network of lighting units and does not change a luminance level of a light in the lighting unit. In this way, a light output of the lighting unit will not be effected by detected events. Once the transmission is complete at transition 718, the lighting unit can transition back to state 704 where the lighting unit is standing by in the manual mode. While in the manual mode, the lighting unit can also detect a motion event or receive a motion detect signal at transition 716. In response, the lighting unit can transition into state 708 where the lighting unit transmits a motion detect signal to other lighting units connected in the selected network of lighting units and does not change a luminance level of a light in the lighting unit. Once the transmission is complete at transition 718, the lighting unit can transition back to state 704 where the lighting unit is standing by in the manual mode. The lighting unit can transition out of the manual mode at transition 712 when a selection of a different operating mode is received at the lighting unit. For example, a selection of a test mode or dual bright mode can be made, in which case the lighting unit would operate thereafter according to state diagram 500 or 600, respectively.

Figure 8:
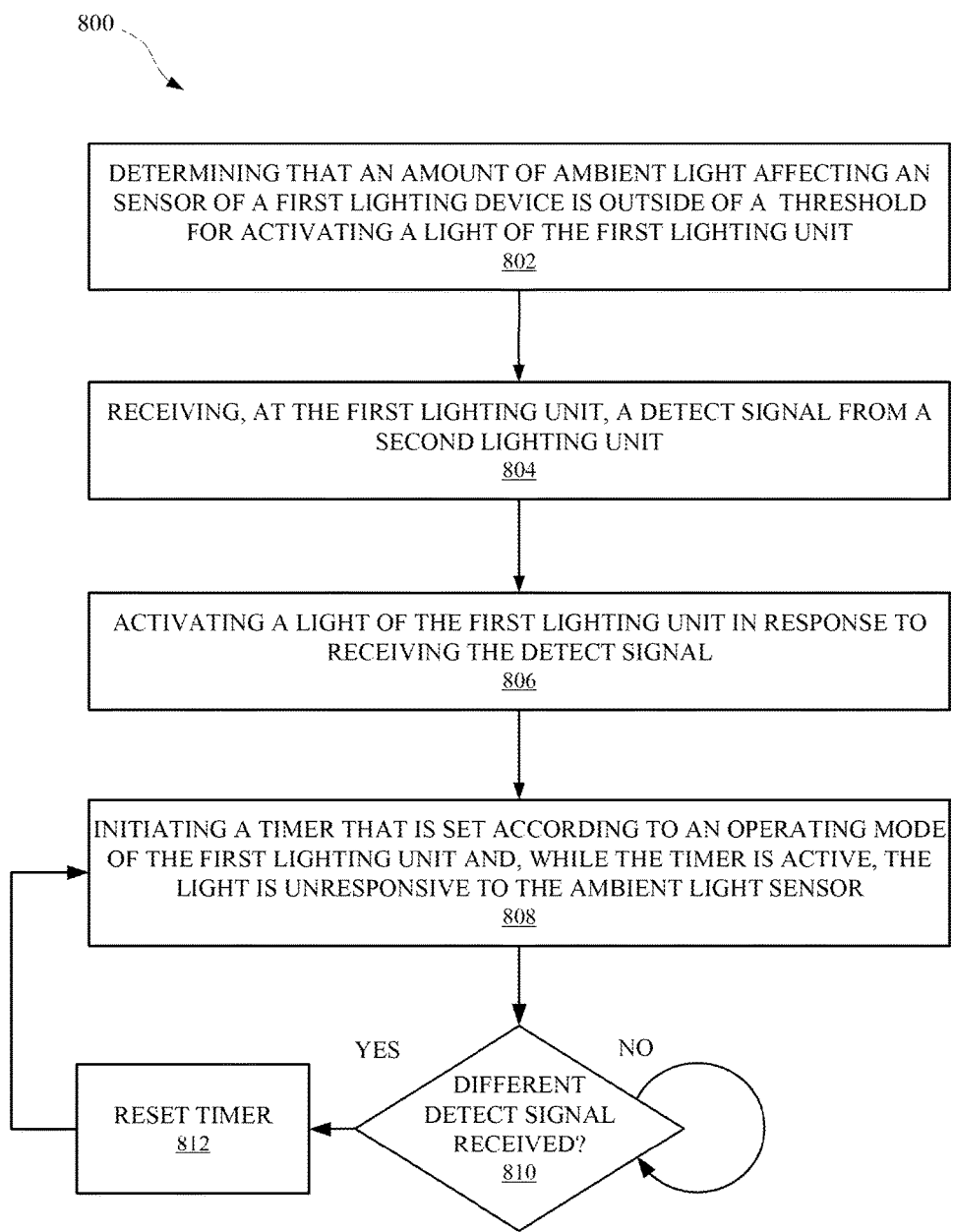
FIG. 8 illustrates a method for controlling a timer of a lighting unit according to whether a unique transaction identifier of a detect signal has been received.

FIG. 8 illustrates a method 800 for controlling a timer of a lighting unit according to whether a unique transaction identifier of a detect signal has been received. The method 800 can be performed by a lighting unit, a remote device capable of controlling one or more lighting units, and/or any other device suitable for controlling a light. The method 800 can include a block 802 of determining that an amount of ambient light affecting a sensor, such as an ambient light sensor, of a first lighting unit is outside a threshold for activating a light of the first lighting unit. The lighting unit can operate such that when the amount of light is within the threshold, the light of the first lighting unit is activated. At block 804, the first lighting unit can receive a detect signal from a second lighting unit. The first lighting unit and the second lighting unit can be connected as part of a network of lighting units that communicate over a wireless connection, as described herein. Additionally, the first lighting unit and the second lighting unit can be arranged to face different directions at different locations. Therefore, the second lighting unit may detect events that have not been detected by the first lighting unit. At block 806, a light of the first lighting unit is activated in response to receiving the detect signal. At block 808, a timer of the first lighting unit is initiated and set according to an operating mode of the first lighting unit. For example, when the first lighting unit is in a test mode, a period for the timer can be less than other periods associated with other operating modes of the first lighting unit. Furthermore, at block 808, while the timer is active, the light of the first lighting unit is unresponsive to the ambient light sensor of the first lighting unit. In this way, when the detect signal is a night detect signal, the first lighting unit and the second lighting unit will illuminate at substantially the same time, despite the ambient light sensor of the first lighting unit not detecting a night event yet. At block 810, a determination is made whether any different signal has been received at the first lighting unit. A different signal can be a signal that includes a transaction identifier that is different than the detect signal provided at block 804. By including transaction identifiers with each detect signal, the network of lighting units can be ensure that the lights do not perpetually remain on unless responding to unique transaction identifiers. At block 810, if a different detect signal is received, then at block 812 the timer is reset and block 808 is repeated. Otherwise, if a different detect signal is not received, the lighting unit can stand by until an event is detected or a signal is received from another lighting unit.

Figure 9:
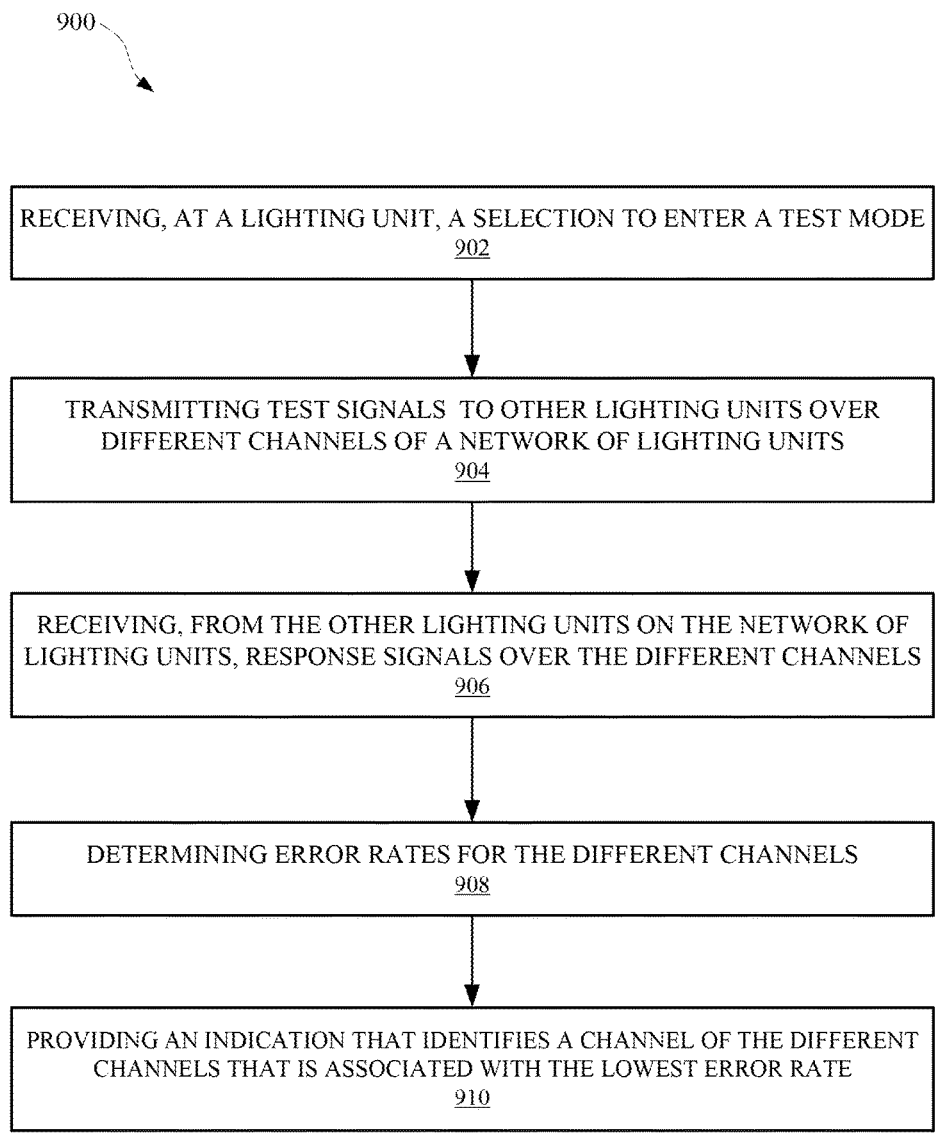
FIG. 9 illustrates a method for identifying a channel of a network of lighting units that is associated with the lowest error rate.

FIG. 9 illustrates a method 900 for identifying a channel of a network of lighting units that is associated with the lowest error rate. The method 900 can be performed by a lighting unit, a remote device capable of controlling one or more lighting units, and/or any other device suitable for controlling a light. The method 900 can include a block 902 of receiving, at the lighting unit, a selection to enter a test mode. The test mode can be used to identify a channel from multiple different channels that will cause the least number of errors resulting from transmitting signals between lighting units of the network of lighting units. The method 900 can further include a block 904 of transmitting test signals to other lighting units over the different channels of the network of lighting units. The test signals can mimic night detect signals and/or motion detect signals, and therefore cause other lighting units in the network of lighting units to illuminate or otherwise respond. Furthermore, the test signals can be communicated according to a frequency hopping algorithm that allows the lighting unit to send signals over multiple different channels at different frequencies. In response to the test signals, the other lighting units can respond with response signals. At block 906, the lighting unit can receive the response signals from the other lighting units over the different channels. At block 908, the lighting unit can determine error rates for the different channels based on the contents of the response signals and/or conditions relevant to the transmission of the response signals. In some embodiments, calculation of the error rates can be off loaded to a remote device in order to conserve power and processing time for the lighting unit. At block 910, the lighting unit can provide an indication that identifies a channel of the different channels that is associated with the lowest error rate. The indication can be provided at an interface of the lighting unit. For example, the lighting unit can include an interface that has identifiers for the different channels, and the lighting unit can illuminate or otherwise indicate to the user that one of the channels identified at the interface is associated with the lowest error rate. In response, the user can use the interface to select the channel and also transition the lighting unit out of the test mode.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

We claim:

1. A computing device, comprising:
a lighting unit, the lighting unit including
a light;
a sensor configured to provide an output in response to detecting an event;
a transmitter configured to communicate with a network of a plurality of lighting unit devices, the plurality of lighting unit devices including a first lighting unit and a second lighting unit;
one or more processors connected to the light, the sensor, and the transmitter; and
one or more memory devices configured to store instructions that when executed by the one or more processors, cause the one or more processors to perform steps that include:
receiving a selection of both (i) a manual operating mode and (ii) an output level for the light;
receiving, via the transmitter, a motion detect signal from a first lighting device that is connected to the network of lighting unit devices, wherein, in accordance with receiving the selection of the manual operating mode, the output level of the light does not change based on both the motion detect signal and the output from the sensor; and
transmitting, via the transmitter, the motion detect signal to a second lighting device in the network of lighting unit devices;
wherein the manual operating mode of the lighting unit indicates that the lighting unit ceases sending motion detect signals to the network of lighting unit devices based upon the detected event of the sensor but continues to transmit the received motion detect signal from the first lighting device to the second lighting device in the network of lighting unit devices.

2. The computing device of claim 1, wherein the transmitting of the motion detect signal occurs after a predetermined delay period has transpired for preventing signal collisions over the network of lighting unit devices.

3. The computing device of claim 1, wherein the steps further include:
receiving a selection of a dual bright operating mode, wherein the dual bright operating mode indicates that the output level of the light is at a first output level and is responsive to the output of the sensor detecting a nighttime event while in the dual bright operating mode; and wherein the output level of the light is at a second output level higher than the first output level upon receiving a motion detect signal.

4. The computing device of claim 3, wherein the light is configured to transition between multiple different output levels in response to signals, from the second lighting device, that are received while the dual bright operating mode is selected.

5. A system, comprising:
a sensor responsive to an event occurring at a location;
a transmitter configured to operate over multiple channels that include a first channel to which a first lighting device is connected, and a second channel to which a second lighting device is connected; and
a processor connected to the sensor and the transmitter, the processor configured to severally operate in a first operating mode and a second operating mode,
wherein the first operating mode causes the transmitter to provide test signals over the first channel and the second channel to identify a least error prone channel, and
the second operating mode causes the transmitter to exclusively provide a signal over the least error prone channel to the first lighting device or the second lighting device, the signal corresponding to a detected event occurring at the location;
the system further comprising:
an interface that includes:
a first selector that is configured to cause the transmitter to transition between the first channel and the second channel; and
a second selector that is configured to cause the processor to transition between the first operating mode and the second operating mode.

6. The system of claim 5, wherein the sensor is a motion sensor and the event is motion occurring at the location.

7. The system of claim 5, wherein the processor is further configured to receive response signals from the first lighting device and the second lighting device when the first operating mode is selected.

8. The system of claim 7, wherein the least error prone channel is identified by at least comparing the response signals from the first lighting device and the second lighting device.

9. The system of claim 5, further comprising:
a light, wherein the light is configured to be unresponsive to detect signals received over the first channel and the second channel when the processor is operating in a third operating mode corresponding to a manual override.

10. The system of claim 9, wherein the transmitter is further configured to retransmit the detect signals received over the first channel and the second channel when the processor is operating in the third operating mode.

11. A system, comprising:
a sensor responsive to an event occurring at a location;
a transmitter configured to operate over multiple channels that include a first channel to which a first lighting device is connected, and a second channel to which a second lighting device is connected; and
a processor connected to the sensor and the transmitter, the processor configured to severally operate in a first operating mode and a second operating mode,
wherein the first operating mode causes the transmitter to provide test signals over the first channel and the second channel to identify a least error prone channel, and
the second operating mode causes the transmitter to exclusively provide a signal over the least error prone channel to the first lighting device or the second lighting device, the signal corresponding to a detected event occurring at the location;
wherein, when operating in the second operating mode, the processor is configured to determine whether a detect signal received over the least error prone channel includes a unique identifier relative to previously received detect signals.

12. The system of claim 11, furthermore comprising:
a light connected to the processor, wherein the light is illuminated when the processor determines that the detect signal is received; and
a memory device connected to the processor, the memory device configured to store parameters for a timer that determines how long the light remains illuminated.

13. The system of claim 12, wherein the timer is reset when the light is illuminated and another signal with a different unique identifier is received.

* * * * *